H. JOHNSTON.
VALVE MECHANISM FOR INTERNAL COMBUSTION ENGINES.
APPLICATION FILED NOV. 8, 1915.
1,287,037.
Patented Dec. 10, 1918.
2 SHEETS—SHEET 1.
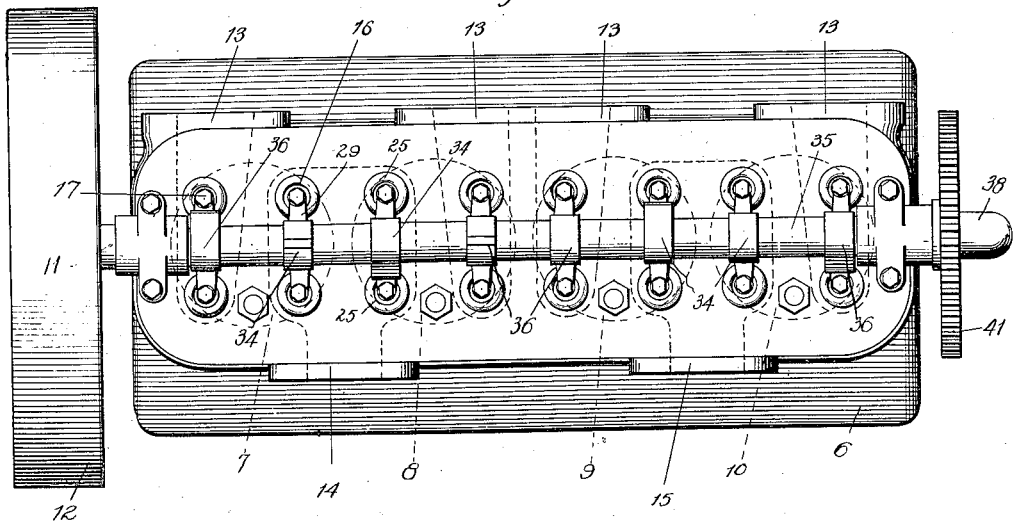
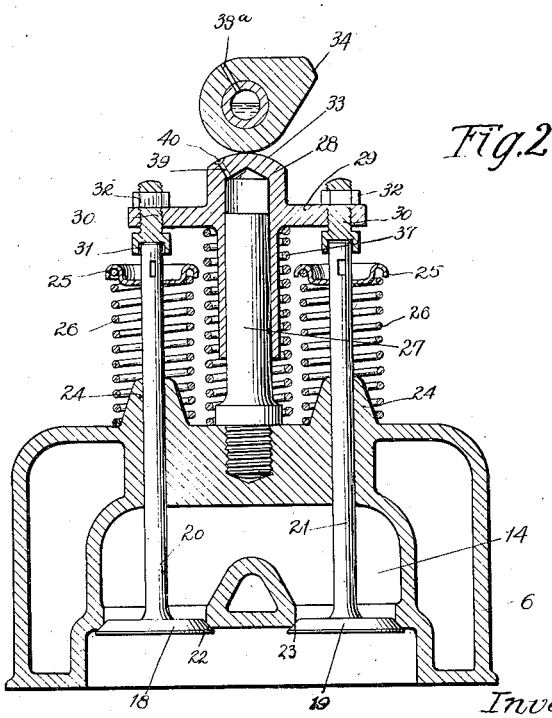
Witnesses:
Inventor
Harry Johnston
By Williams & Bradbury
Attorneys.

H. JOHNSTON.
VALVE MECHANISM FOR INTERNAL COMBUSTION ENGINES.
APPLICATION FILED NOV. 8, 1915.
1,287,037.
Patented Dec. 10, 1918.
2 SHEETS—SHEET 2.
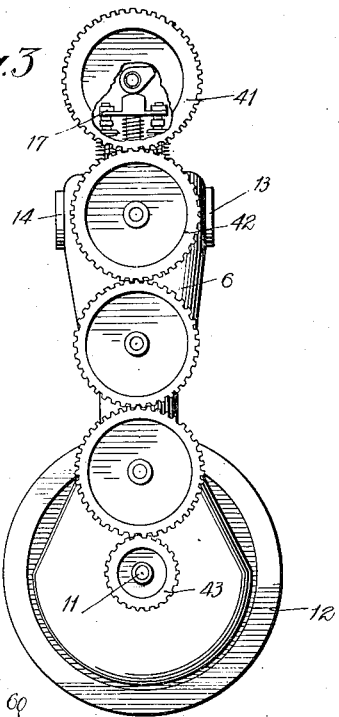
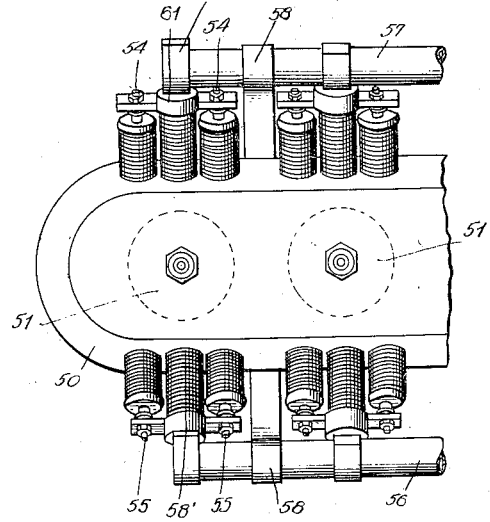
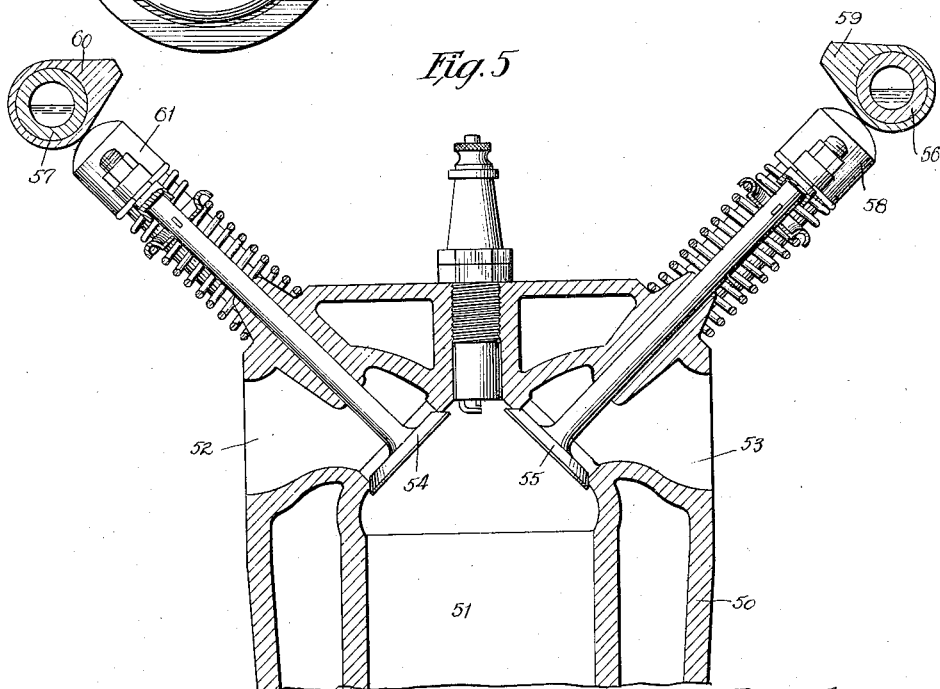
Inventor
Harry Johnston
By Williams & Bradbury
Attorneys.

UNITED STATES PATENT OFFICE.

HARRY JOHNSTON, OF CHICAGO, ILLINOIS.

VALVE MECHANISM FOR INTERNAL-COMBUSTION ENGINES.

1,287,037.   Specification of Letters Patent.   Patented Dec. 10, 1918.

Application filed November 8, 1915.   Serial No. 60,237.

*To all whom it may concern:*

Be it known that I, HARRY JOHNSTON, a citizen of the United States, residing at Chicago, in the county of Cook and State of Illinois, have invented certain new and useful Improvements in Valve Mechanism for Internal-Combustion Engines, of which the following is a clear, concise, and exact description, reference being had to the accompanying drawings, forming a part of the specification.

My invention relates to valve mechanism for internal combustion engines and more particularly to the class of internal combustion engines which are provided with two or more valves for the intake opening in each cylinder and two or more valves for the exhaust opening in each cylinder.

The main object of this invention is the provision of mechanism for imparting to each set of intake valves or exhaust valves a push which is parallel to the direction in which the associated valves operate, instead of a push in the arc of a circle, as is the case in the use of a rocker-arm or walking-beam construction. In the employment of the old rocker-arm mechanism for actuating the valves it has been found that the motion imparted to the valves causes the valve stems to bear against only one side of the bushing in which they are slidably mounted. The valve stems, as well as the bushings in which they are mounted, in this construction, wear away on only one side, that is the side nearest the pivot around which the rocker-arm operates. This wear ultimately causes the valve stems to bend or to break. By the use of my invention I impart to the valve stems a straight push and I provide an intermediate member which receives the side thrust from the operating or cam mechanism. This intermediate member is mounted independently of the valves and can be constructed so that the wear thereon is negligible.

A further object of my invention is the provision of a valve mechanism which is light in construction, so that the inertia and momentum which must be overcome by the cam and spring mechanism is very slight.

As the intermediate member, or reciprocating member as I shall refer to it hereinafter, is mounted independently of the valves with which it coöperates, I am enabled to employ any size spring for returning it again to its normal position after it has been operated by its actuating mechanism.

I also provide a simple and effective means for retaining the reciprocating member in alinement with the valve stems so that the necessity of keying the reciprocating member to the engine casing to prevent angular movement thereof is eliminated. To obtain this object I provide a cross-arm carried by the reciprocating member which carries a pair of cup-shaped tappets, each arranged to fit over a valve stem. The upper ends of the valve stems are always disposed inside of the cups, and thus prevent angular movement of the intermediate member relative to its support.

These and other features of my invention will be more clearly understood by referring to the accompanying drawings, wherein Figure 1 is a plan view of an internal combustion engine provided with the valve mechanism of my invention;

Fig. 2 is a vertical cross-sectional view of a portion of the engine illustrating a pair of valves co-acting to control either an inlet or an exhaust opening;

Fig. 3 is an end elevational view of Fig. 1, showing the gear mechanism for operating the valve cam shaft;

Fig. 4 is a fragmentary plan view of a portion of an internal combustion engine of the spherical head type; and Fig. 5 is a view similar to Fig. 2 of the valve mechanism employed in Fig. 4.

Similar characters of reference refer to similar parts throughout the several views.

Referring first to Fig. 1, 6 illustrates the casing of an internal combustion engine provided with the cylinders 7, 8, 9 and 10. These cylinders, as is well known, contain pistons connected with the crank shaft 11, upon which is mounted the fly-wheel 12. Each of the cylinders 7 to 10, inclusive, is provided with an exhaust port 13, which terminates in one side of the casing. Flanges are provided adjacent these ports to facilitate the connection of an exhaust manifold.

Communicating with the cylinders 7 and 8 is an intake port 14. A similar intake port is provided at 15, which communicates with the cylinders 9 and 10. Each intake port is provided with valve mechanism illustrated as a whole at 16, and each exhaust port with valve mechanism illustrated at 17. The construction of the exhaust valves is identical with that of the intake valves and operates in the same manner, except that cam mechanism is employed for operating them at different times.

The valve mechanism 16. as illustrated in Fig. 2, comprises a pair of valves 18 and 19, to each of which is rigidly secured a valve stem 20 and 21. The valves 18 and 19 seat against the valve seats 22 and 23 provided in the casing 6 in the head of the cylinder. Each of the valve stems 20 and 21 extends up through a bushing 24 and has pinned at its upper end a washer 25. Interposed between this washer and the casing 6 is a compression spring 26 which normally retains the valves in their seated position.

Disposed midway between the valve stems 20 and 21 and screw-threaded into the casing 6 is a stud 27 upon which is slidably mounted a reciprocating sleeve 28. This sleeve carries at its upper end a cross-arm 29, into which is screw-threaded at each end a tappet 30. The lower end of each tappet is hollowed out at 31 to accommodate the upper end of its associated valve stem. The hollow end of the tappets are hexagonal in shape and are rigidly secured to the shank which is screw-threaded into the cross-arm, thereby making the tappets longitudinally adjustable. A lock nut 32 serves to lock the tappet against movement after it has been set to a desired position. The upper end of the reciprocating sleeve carries a cam face 33 which coöperates with a cam 34 mounted upon the cam shaft 35. A similar cam 36 is provided for each of the exhaust valves.

Interposed between the cross-arm 29 and the casing of the engine is a compression spring 37, which tends to move the reciprocating sleeve in a direction toward the cam shaft. The cam shaft as illustrated in Fig. 2 is hollow and is connected by means of a pipe 38 to an oil pump, which in turn is operated by the engine. Each of the cams 34 and 36 is provided with a bore 38ª, which, when moved around on the under side of the cam shaft permits oil to escape and flow over the cam face 33. The upper end of the sleeve 28 is also drilled at 39 and contains a recess 40 for catching the oil as it flows over the cam face. The oil is then permitted to pass to the interior of the sleeve and around the stud 27 to lubricate the wearing surfaces between the stud and the reciprocating sleeve.

The cam shaft 35 has rigidly connected thereto at its outer end a gear 41, which is connected by intermediate gearing 42 to the gear 43. The gears 41 and 43 have a two to one ratio, so that the cam shaft is rotated once for every two revolutions of the crank shaft. For a two-cycle engine this gear ratio would, of course, be changed to a one to one ratio.

As the cam shaft 35, and thus the cam 34, is rotated the reciprocating sleeve 28 will be moved downwardly against the tension of the spring 37 and thus cause the tappets 30, 30 to engage the valve stems 20 and 21. It is to be noted that a slight space is provided between the upper end of the valve stems and the tappets so that a slight movement of the reciprocating member is necessary before the cross-arm really engages the valves. A continued movement of the sleeve will cause the valves to unseat and provide a free communication between the interior of the cylinder and the port. It is to be noted that although the cam 34 transmits to the sleeve 28 a sidewise thrust, the valve stems 20 and 21 receive only a thrust in a direction parallel to the direction in which they operate. There is, therefore, no tendency to bend the valve stems or cause excessive wear on only one side thereof. The hollow tappets 30, 30 always extend over the ends of the valve stems so that angular movement of the reciprocating sleeve relative to its supporting stud is prevented.

Referring now to the modification illustrated in Figs. 4 and 5, 50 illustrates the engine casing provided with the cylinders 51, 51. This engine is of the racing-car type, wherein the heads of the cylinders are spherical, as illustrated in Fig. 5. Each of the cylinders is provided with an intake port 52 and an exhaust port 53. The intake port is controlled by means of valve mechanism similar to that illustrated in Fig. 2, said mechanism consisting of two valves 54, 54. The exhaust valve mechanism is similar to the intake and consists of two valves 55, 55. The valves 55 are disposed parallel to a cam shaft 56 and are positioned directly under the same. The valves 54 are disposed parallel to and positioned directly under a second cam shaft 57. These cam shafts are supported in any suitable way from the casing of the engine, as illustrated at 58. The reciprocating sleeve for operating the valves 55 is illustrated at 58 and is arranged to be actuated by the cam 59. The cam 60 of the cam shaft 57 operates the reciprocating sleeve 61 of the valves 54. The operation of the valve mechanism in this modification is similar to the operation of the valve mechanism illustrated in Figs. 1 to 3, inclusive.

Although I have described but one form of the reciprocating member, it can be seen that many modifications thereof can be made without departing from the spirit and scope of my invention.

What I claim is:

1. Valve mechanism for internal combustion engines comprising a plurality of valves, valve stems, one for each valve disposed parallel to each other, a stud carried by the engine casing and disposed parallel with the valve stems, a sleeve mounted around the stud and arranged to reciprocate thereon and a cam disposed directly over the sleeve adapted to impart movement to the sleeve relatively to the stud, said sleeve being provided with means extending over the valve stems, whereby the valves are opened when the sleeve is moved in one direction by the said cam.

2. Valve mechanism for internal combustion engines comprising a plurality of valves, valve stems, one for each valve disposed parallel to each other, a spring for each valve tending to hold the valve in closed position, a stud carried by the engine casing and disposed parallel with the valve stems, a sleeve mounted around the stud and arranged to reciprocate thereon, a cam disposed directly over the sleeve adapted to impart movement to the sleeve relatively to the stud, said sleeve being provided with extensions projecting over the valve stems, whereby the valves are opened when the sleeve is moved in one direction by the said cam and a compression spring encircling the stud for moving the sleeve in the opposite direction.

3. Valve mechanism for internal combustion engines comprising a plurality of valves, valve stems, one for each valve disposed parallel to each other, a stud carried by the engine casing and disposed parallel with the valve stems, a sleeve mounted around the stud and arranged to reciprocate thereon, a hollow cam shaft disposed directly over the sleeve arranged to impart movement to the sleeve relatively to the stud, said sleeve being provided with means extending over the valve stems whereby the valves are opened when the sleeve is moved in one direction by the cam shaft, said cam shaft being arranged to receive lubricating oil and containing over said sleeve a passageway leading from the interior of the shaft to the exterior thereof, whereby lubrication of the sleeve is effected.

4. Valve mechanism for internal combustion engines comprising a plurality of valves, valve stems, one for each valve, disposed parallel to each other, tappet mechanism consisting of two elements, one slidably mounted on the other, one of said elements being mounted on the engine casing, and the other provided with means arranged to engage the valve stems, and a hollow cam shaft disposed directly over the last mentioned element and adapted to impart movement to that element in a direction to open the valves, said cam shaft being arranged to receive a lubricant and containing over said last mentioned element a passage way leading from the interior of the shaft to the exterior thereof, whereby lubrication of the tappet mechanism is effected.

In witness whereof, I have hereunto subscribed my name this 3rd day of November, A. D. 1915.

HARRY JOHNSTON.

Witnesses:
ROBERT F. BRACKE,
ALBIN C. AHLBERG.